United States Patent
Mabuchi (10) Patent No.: US 7,586,487 B2
(45) Date of Patent: *Sep. 8, 2009

(54) SOLID STATE IMAGING APPARATUS AND METHOD FOR DRIVING THE SAME

(75) Inventor: Keiji Mabuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 568 days.

This patent is subject to a terminal disclaimer.

(21) Appl. No.: 11/329,746

(22) Filed: Jan. 11, 2006

(65) Prior Publication Data

US 2006/0119593 A1 Jun. 8, 2006

Related U.S. Application Data (63) Continuation of application No. 10/325,380, filed on Dec. 20, 2002, now Pat. No. 7,046,238.

(30) Foreign Application Priority Data

Dec. 25, 2001 (JP) .............................. 2001-392170

(51) Int. Cl.
*G09G 5/00* (2006.01)
(52) U.S. Cl. ................. 345/204; 345/7; 345/8; 345/9
(58) Field of Classification Search ........... 345/7–9, 345/32, 63, 86, 87, 97, 102, 204; 348/207, 348/222.1, 239, 243, 273, 302, 308, 371, 348/296, 250, 310; 349/202; 359/227, 463; 250/208.1, 214.1
See application file for complete search history.

(56) References Cited

U.S. PATENT DOCUMENTS

| | | | |
|---|---|---|---|
| 3,965,668 A | | 6/1976 | Tomokazu et al. |
| 5,187,583 A | * | 2/1993 | Hamasaki ................... 348/250 |
| 6,545,659 B2 | | 4/2003 | Kuramoto |
| 6,661,459 B1 | * | 12/2003 | Koizumi et al. ............. 348/310 |
| 6,710,920 B1 | | 3/2004 | Mashitani et al. |
| 6,750,437 B2 | * | 6/2004 | Yamashita et al. ........ 250/208.1 |
| 6,940,059 B2 | * | 9/2005 | Mabuchi ................... 250/208.1 |
| 6,992,578 B2 | | 1/2006 | Aoki et al. |
| 7,068,315 B1 | * | 6/2006 | Suzuki et al. ............... 348/308 |
| 2003/0095192 A1 | | 5/2003 | Horiuchi |
| 2004/0135064 A1 | * | 7/2004 | Mabuchi ................... 250/208.1 |
| 2004/0201753 A1 | | 10/2004 | Kondo et al. |
| 2006/0007334 A1 | * | 1/2006 | Mabuchi ..................... 348/296 |
| 2006/0119593 A1 | * | 6/2006 | Mabuchi ..................... 345/204 |

FOREIGN PATENT DOCUMENTS

| | | |
|---|---|---|
| JP | 2000-125203 | 4/2000 |
| JP | 2000-516774 | 12/2000 |
| JP | 2001-045378 | 2/2001 |
| JP | 2001-268451 | 9/2001 |
| JP | 2003-198948 | 7/2003 |

* cited by examiner

*Primary Examiner*—Prabodh M. Dharia
(74) *Attorney, Agent, or Firm*—Robert J. Depke; Rockey, Depke & Lyons, LLC (57) ABSTRACT

The vertical selection circuit of the imaging apparatus selects a selection line, a first shutter line, and a second shutter line to divide a single frame into three parts at arbitrary ratios. A first output signal is generated during a period from the first shutter line to the second shutter line and a second output signal generated during a period from the second shutter line to the selection line. By mixing the two output signals described above, an image with a large dynamic range can be obtained.

12 Claims, 10 Drawing Sheets

SOLID STATE IMAGING APPARATUS AND METHOD FOR DRIVING THE SAME

RELATED APPLICATION

Priority Claim

This application is a continuation of U.S. patent application Ser. No. 10/325,380, filed on Dec. 20, 2002, which claims the priority to Japanese Patent Application Number JP2001-392170 filed Dec. 25, 2001, which is incorporated herein by reference.

BACKGROUND OF THE INVENTION

1. Field of the Invention

The present invention relates to a solid state imaging apparatus and a method for driving a solid state imaging apparatus, and more particularly, to a solid state imaging apparatus and a method for driving a solid state imaging apparatus, capable of detecting light over a large dynamic range.

2. Description of the Related Art

Figure 9:
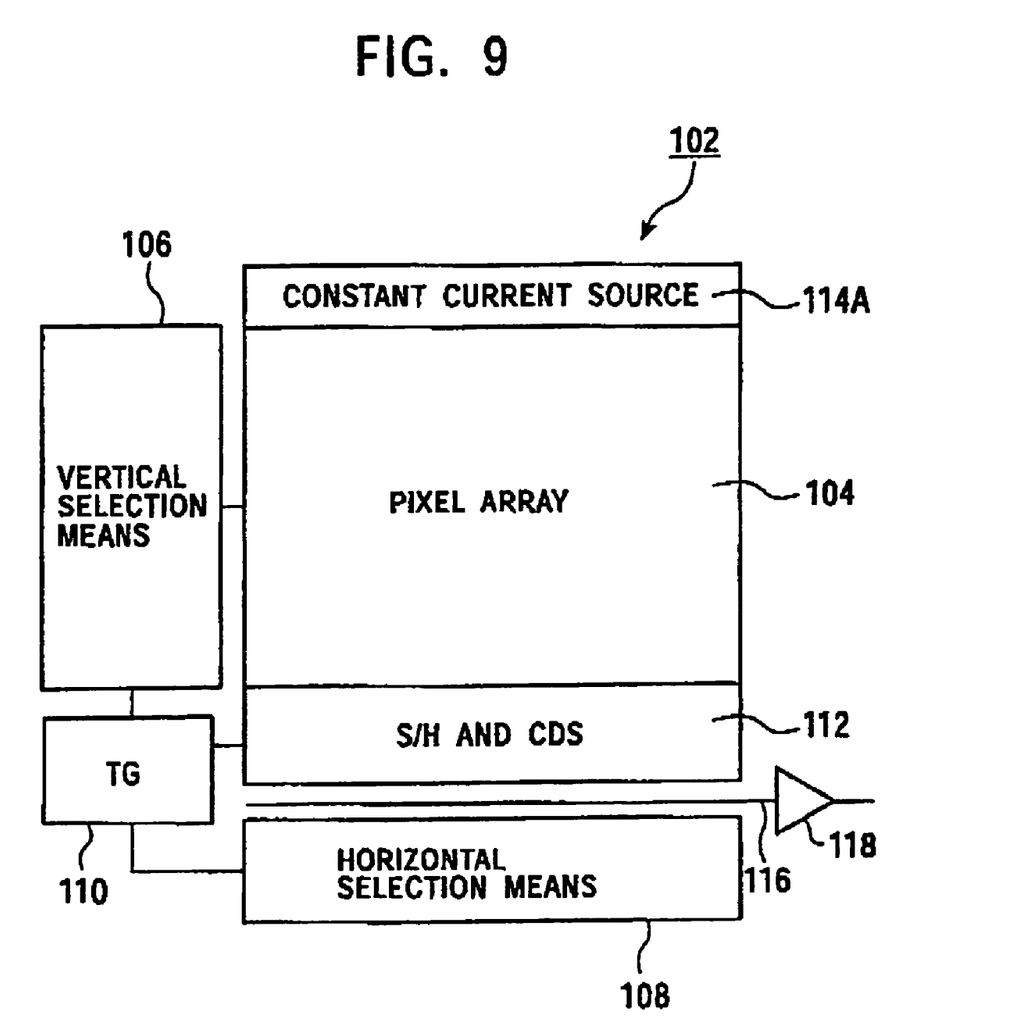
FIG. 9 is a diagram showing a conventional solid state imaging apparatus.
Figure 10:
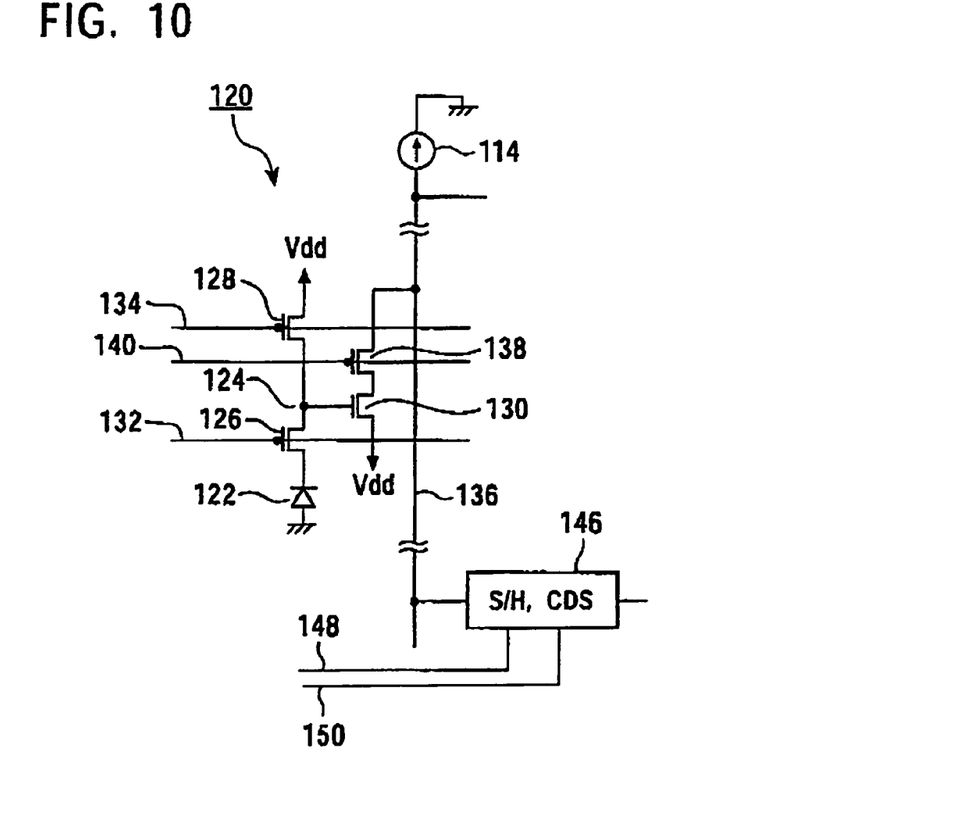
FIG. 10 a circuit diagram showing a pixel and its peripheral part of the solid state imaging apparatus shown in FIG. 9.
Figure 11:
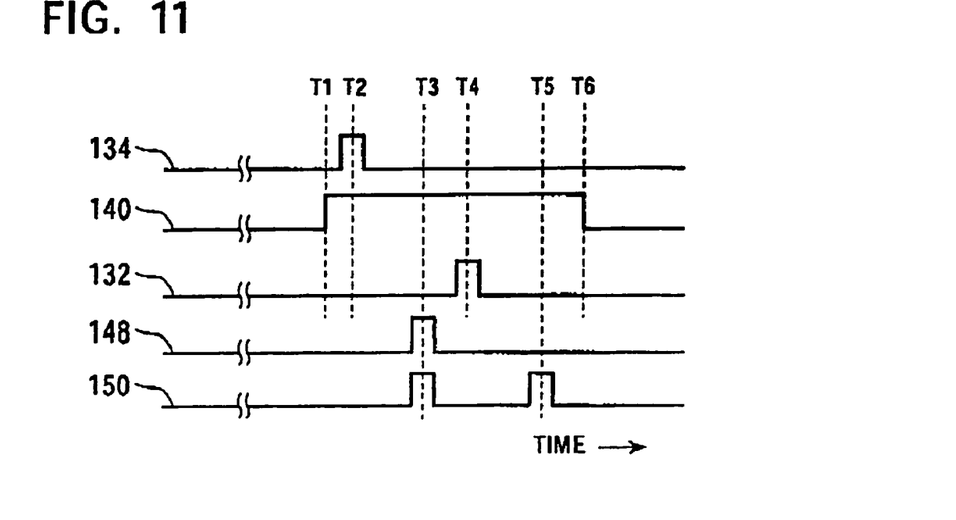
FIG. 11 is a timing chart of an operation of the circuit shown in FIG. 10.

FIG. 9 shows a conventional solid state imaging apparatus, and FIG. 10 shows a pixel and its peripheral part of the solid state imaging apparatus shown in FIG. 9. FIG. 11 is a timing chart showing an operation of the circuit shown in FIG. 10.

More specifically, the solid state imaging apparatus 102 shown in FIG. 9 is a CMOS photosensor made up of a pixel array 104 formed on a semiconductor substrate, vertical selection means 106, horizontal selection means 108, a timing generator (TG) 110, an S/H-CDS set 112, and a constant current source set 114A. The pixel array 104 includes a large number of pixels arranged in a matrix fashion. An electric signal is generated by each pixel in response to light incident on the pixel. In accordance with timing pulses generated by the timing generator 110, the pixels are sequentially selected by the vertical selection means 106 and the horizontal selection means 108, and the electric signals generated by the respective pixels are output from the output unit 118 via the horizontal signal line 116.

As shown in FIG. 10, each pixel 120 includes a photodiode 122, a floating diffusion (FD) unit 124 serving as a charge-voltage conversion means for generating a voltage corresponding to the amount of a charge, a transfer gate 126 for connecting the photodiode 122 to the FD element 124 in response to a transfer pulse, a reset gate 128 for connecting the FD element 124 to a power supply Vdd in response to a reset pulse, and an amplification transistor 130 for outputting the voltage of the FD element 124.

The anode of the photodiode 122 is grounded and its cathode is connected to the source of an n-type MOSFET (MOS Field Effect Transistor) serving as the transfer gate 126. The drain of the MOSFET 126 is connected to the FD element 124. A transfer pulse 132 is supplied from the vertical selection means 106 to the gate of the MOSFET 126. The reset gate 128 is also formed with an n-type MOSFET, wherein the source thereof is connected to the FD element 124, the drain is connected to the power supply Vdd, and the gate is connected to the vertical selection means 106 such that a reset pulse 134 is supplied to the gate.

The n-type MOSFET serving as the amplification transistor 130 is connected to the FD element 124, and the drain is connected to the power supply Vdd. An n-type MOSFET serving as an address gate 138 is disposed between the amplification transistor 130 and the vertical signal line 136, wherein an address pulse 140 is supplied to the gate of the n-type MOSFET 138 from the vertical selection means 106.

The source of the amplification transistor 130 is connected to the drain of the address gate 138, and the source of the address gate 138 is connected to the vertical signal line 136.

One vertical signal line 136 is disposed for each column of pixels 120 arranged in the matrix fashion, such that the sources of all address gates 138 in the same column are connected to a corresponding vertical signal line 136. One end of each vertical signal line 136 is connected to a constant current source 114 of the constant current source set 114A disposed outside the pixel array 104 so that a constant current is supplied to the vertical signal line 136 from the constant current source 114. The other end of the vertical signal line 136 is connected to the S/H-CDS set 112 disposed outside the pixel array 104.

The S/H-CDS set 112 includes S/H-CDS circuits 146 connected to the respective vertical signal lines 136. First and second sampling pulses 148 and 150 generated by the timing generator 110 is supplied to each S/H-CDS circuit 146. In response to these sampling pulses, the S/H-CDS circuit 146 holds a voltage (light detection voltage) generated by the FD element 124 in accordance with a signal output from the photodiode 122 and output over the vertical signal line 136 by the amplification transistor 130, and also holds a voltage (offset voltage) which is output from the FD element 124 when the FD element 124 is reset. A voltage corresponding to the difference between these two voltages is output from the S/H-CDS circuit 146. When the first and second sampling pulses 148 and 150 are supplied at the same time to the S/H-CDS circuit 146, the offset voltage is held by the S/H-CDS circuit 146. On the other hand, when only the second sampling pulse 150 is supplied to the S/H-CDS circuit 146, the light detection voltage is held.

The output signals from the S/H-CDS circuits 146 connected to the respective vertical signal lines 136 are sequentially selected by the horizontal selection means 108 in accordance with the timing signal generated by the timing generator 110 and supplied via the horizontal signal line 116 to the output unit 118. The output unit 118 outputs the received signals. The output unit 118 is made up of an amplifier, an AGC circuit, and an analog-to-digital converter.

The operation of the solid state imaging apparatus 102 constructed in the above-described manner is described below with reference to FIG. 11, wherein the discussion will focus on the operation of the pixel 120.

In response to the timing pulse supplied from the timing generator 110, the vertical selection means 106 selects one line of the pixel array 104. At time T1, the vertical selection means 106 supplies an address pulse 140 (with a high level) to pixels 120 in the selected line. More specifically, the address pulse 140 is supplied to the address gate 138 of each pixel 120, and the address gate 138 turns on in response to the address pulse 140. As a result, the amplification transistor 130 is connected to the vertical signal line 136.

At time T2 after that, the vertical selection means 106 outputs a reset pulse 134 to turn on the reset gate 128 thereby connecting the FD element 124 to the power supply Vdd. As a result, a charge (electrons) accumulated in the FD element 124 is removed. The voltage of the FD element 124 in the reset state is output over the vertical signal line 136 via the amplification transistor 130. When the address gate 138 is in the on-state, a source follower is formed by the amplification transistor 130 and the constant current source 114, and thus a voltage precisely corresponding to the voltage of the FD element 124 applied to the gate of the amplification transistor 130 is output over the vertical signal line 136 from the amplification transistor 130 with a low output impedance.

Thereafter, at time T3, the timing generator 110 outputs first and second sampling pulses 148 and 150 to the S/H-CDS circuits 146 connected to the respective vertical signal lines 136. In response, each S/H-CDS circuit 146 holds the offset voltage output over the corresponding vertical signal line 136 from the corresponding amplification transistor 130.

At time T4 after that, the vertical selection means 106 outputs a transfer pulse 132 to turn on the transfer gate 126 thereby transferring the charge (electrons) accumulated in the photodiode 122 during the period till T4 to the FD element 124. The FD element 124 generates a voltage corresponding to the transferred charge, and the generated voltage is output over the vertical signal line 136 via the amplification transistor 130 with a low output impedance.

At time T5, the timing generator 110 outputs a second sampling pulse 150 to the S/H-CDS circuits 146 connected to the respective signal lines 136. In response, each S/H-CDS circuit 146 holds the voltage output from the corresponding amplification transistor 130 over the corresponding vertical signal line 136. The S/H-CDS circuit 146 determines the difference between the voltage held at this point of time indicating the light detection voltage and the already-held offset voltage and outputs a resultant differential voltage indicating the amount of light incident on the photodiode 122 including no offset component.

The offset component varies from one pixel 120 to another, and such variation in offset component can cause noise. However, the offset component is removed by the S/H-CDS circuit 146, and thus the output voltage includes no such noise.

The output signals from the S/H-CDS circuits 146 connected to the respective vertical signal lines 136 are sequentially selected by the horizontal selection means 108 in accordance with the timing pulse generated by the timing generator 110 and output over the horizontal signal line 116 and further output as an image signal from the output unit 118.

At time T6, the vertical selection means 106 returns the address pulse 140 to a low level to turn off the address gate 138 thereby disconnecting each amplification transistor 130 from the corresponding vertical signal line 136. At this point of time, the operation of the pixels 120 in one line is completed.

Thereafter, in accordance with the timing pulses generated by the timing generator 110, the vertical selection means 106 sequentially selects the pixels 120 from line by line, and the operation described above is performed for each line. When all lines have been selected by the vertical selection means 106, one frame of image signal generated by all pixels 120 is output.

However, in the conventional solid state imaging apparatus 102 described above, the detectable amount of light is limited to the range in which the charge generated in the photodiode 122 does not overflow, that is, the upper limit of the detectable amount of light is determined by the saturation level of the photodiode 122. If the amount of light exceeds the saturation level, the signal charge transferred to the FD element 124 becomes constant regardless of the amount of light, and thus the voltage generated by the FD element 124 saturates at a constant value. Therefore, in a case in which the aperture and the shutter speed are determined on the basis of a dark part of a scene or a subject, the photodiode 122 will saturate for a bright part of the scene or the subject. Thus, the bright part becomes white in a resultant picture and no image is obtained for such a bright part.

To solve the above problem, Japanese Unexamined Patent Application Publication No. 11-313257 discloses a solid state imaging device in which the dynamic range is expanded by outputting a signal corresponding to the logarithm of the amount of incident light. However, in this solid state imaging device, it takes a long time to charge or discharge a capacitor, which can result in an afterimage. Another problem is that the structure of this solid state imaging device does not allow use of an embedded photodiode (in which, the photodiode is formed below, for example, a $p^+$-layer covered with an insulating film at the top) having an advantage of low noise, and thus a high-quality image cannot be obtained. A still another problem is that a large number of circuit elements are needed and thus it is difficult to achieve a small-sized solid state imaging device.

It is known to expand the dynamic range by changing the shutter speed and thus the charge accumulation time of the photodiode 122, and take pictures such that one picture is taken in a short enough period of time so that no saturation occurs in the photodiode 122 and another picture is taken over a long enough period of time. By mixing the resultant two pictures, a picture with an expanded dynamic range is obtained. However, this technique needs a line memory or a frame memory, which results in increases in device size and cost. Another problem is that because two pictures taken at different times are mixed together, it is difficult to obtain a picture of a moving subject. It is also known to change the charge accumulation time between adjacent lines of pixels. In this technique, no memory is needed. However, in this technique, calculation associated with adjacent lines is needed, and thus the device becomes complicated in structure and large in size. Besides, mixing of two pictures into a single picture results in a reduction in resolution.

In view of the above, the applicant for the present invention has proposed solid state imaging apparatuses and methods of driving solid state imaging apparatuses, which allow expansion of the dynamic range for various imaging conditions, in Japanese Patent Applications Nos. 2001-201601, 2001-276529, and 2001-286457 (hereinafter, referred to as previous patent applications).

In the techniques disclosed in the previous patent applications, an optical signal with a large dynamic range is output in addition to a normal optical signal.

However, in the techniques disclosed in the previous patent applications, a signal with a large dynamic range is generated only when light incident on a photodiode (PD) is so high in intensity that an overflow of a charge occurs, and thus the signal does not vary linearly depending on the amount of light in a low-intensity range. This makes it difficult to precisely calculate the intensity of light from the normal signal and the signal with the large dynamic range. Therefore, those techniques are not suitable for applications such as machine vision or measuring instruments in which determination of the precise amount of light is needed, although the techniques can be used in monitor cameras or the like without encountering significant problems.

When the techniques are applied to color pictures, the inaccuracy in the intensity of light results in inaccuracy in color, that is, the resultant color becomes unnatural. Because of the structure associated with the contact, the FD element has a large dark current. As a result, the signal with the large dynamic signal arising from the charge accumulated in the FD element includes a large dark current. This results in a reduction in the signal-to-noise ratio.

SUMMARY OF THE INVENTION

In view of the above, it is an object of the present invention to provide a high-performance, small-sized and low-cost solid state imaging apparatus capable of taking a high-accuracy image with a large dynamic range under various imaging conditions.

It is another object of the present invention to provide a method of driving a solid state imaging apparatus so as to take a high-accuracy image with a large dynamic range under various imaging conditions thereby achieving a high-performance, small-sized and low-cost solid state imaging apparatus.

According to an aspect of the present invention, to achieve the above objects, there is provided a solid state imaging apparatus comprising a pixel array including a plurality of pixels arranged in a matrix fashion, vertical selection means for sequentially selecting horizontal lines of pixels in the pixel array line by line in a vertical direction, and signal processing means for processing signals output from the pixels selected by the vertical selection means, wherein the vertical selection means has a capability of selecting at least two lines of pixels in the pixel array and sequentially shifting the selected lines, and the signal processing means has a capability of independently reading the signals output from the respective pixels in the two lines selected by the vertical selection means.

In this solid state imaging apparatus according to the present invention, two pixel lines are selected by the vertical selection means and signals output from the respective pixels in the selected two pixel lines are independently read by the signal processing means thereby obtaining pixel signals the amplitudes of which depend linearly on the amount of light incident on the solid state imaging apparatus during two respective periods without encountering a signal overflow from the photoelectric conversion element which can occur in the techniques disclosed in the previous patent applications, and thus obtaining an image signal with a large dynamic range from the pixel signals.

This solid state imaging apparatus according to the present invention can be realized without needing an additional special circuit. Thus, the solid state imaging apparatus provided by the present invention has high performance and is capable of taking a high-accuracy image with a large dynamic range under various imaging conditions, wherein the solid state imaging apparatus can be realized into a small-sized form and can be produced at low cost.

According to another aspect of the present invention, there is provided a method of driving a solid state imaging apparatus, said solid state imaging apparatus comprising a pixel array including a plurality of pixels arranged in a matrix fashion, vertical selection means for sequentially selecting horizontal lines of pixels in the pixel array line by line in a vertical direction, and signal processing means for processing signals output from the pixels selected by the vertical selection means, the method comprising the steps of selecting, using the vertical selection means, at least two lines of pixels in the pixel array and sequentially shifting the selected lines, and independently reading, using the signal processing means, signals output from the respective pixels in the two lines selected by the vertical selection means.

In this method of driving a solid state imaging apparatus according to the present invention, two pixel lines are selected by the vertical selection means and signals output from the respective pixels in the selected two pixel lines are independently read by the signal processing means thereby obtaining pixel signals the amplitudes of which depend linearly on the amount of light incident on the solid state imaging apparatus during two respective periods without encountering a signal overflow from the photoelectric conversion element which can occur in the techniques disclosed in the previous patent applications, and thus obtaining an image signal with a large dynamic range from the pixel signals.

This method according to the present invention can be implemented without needing an additional special circuit. Thus, the method makes it possible to take a high-accuracy image with a large dynamic range under various imaging conditions and makes it possible to realize a high-performance, small-sized and low-cost solid state imaging apparatus.

DESCRIPTION OF THE PREFERRED EMBODIMENTS

Embodiments of the present invention are described below with reference to the accompanying drawings.

Figure 1:
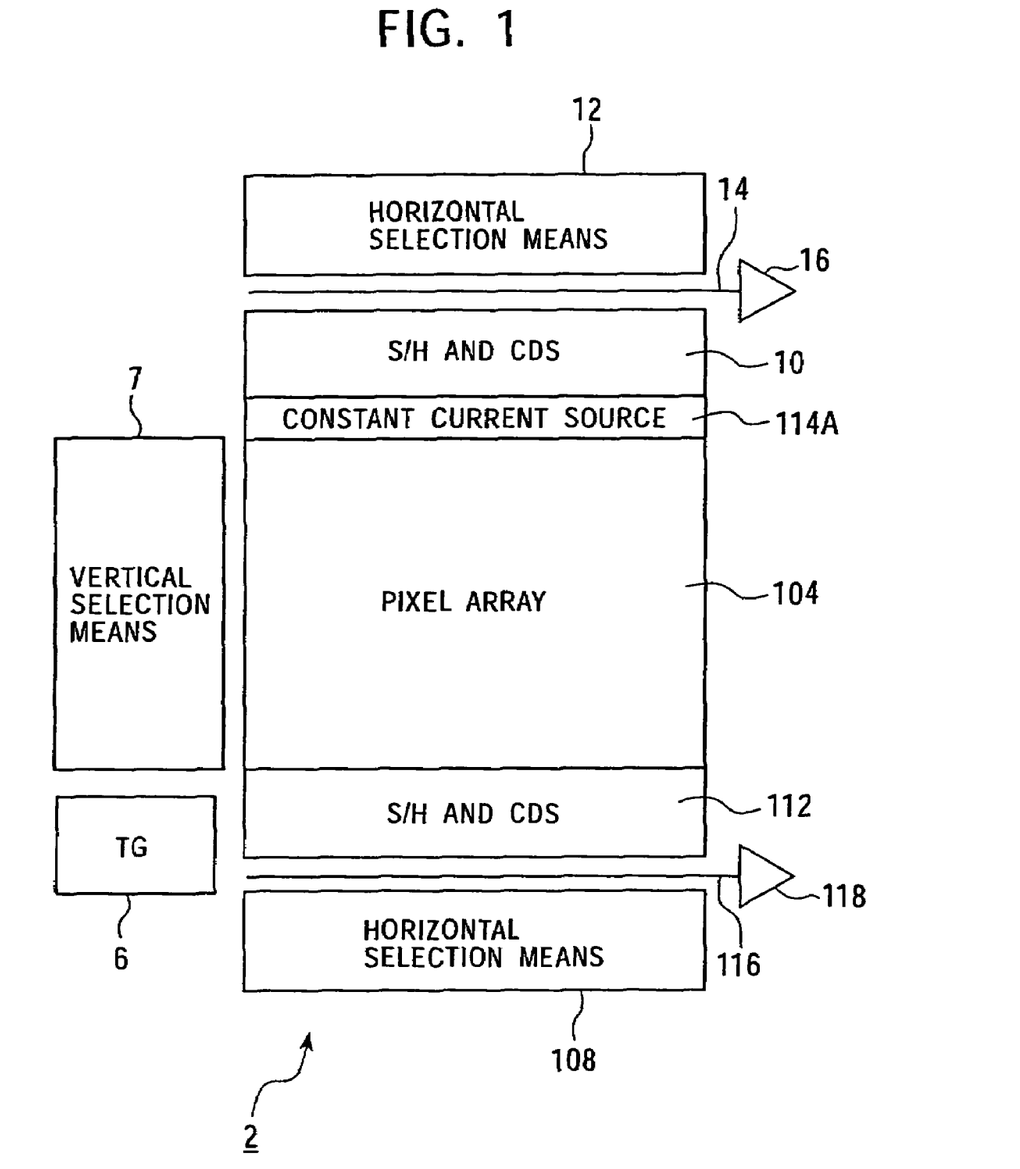
FIG. 1 is a general view of a solid state imaging apparatus according to a first or second embodiment of the present invention.
Figure 2:
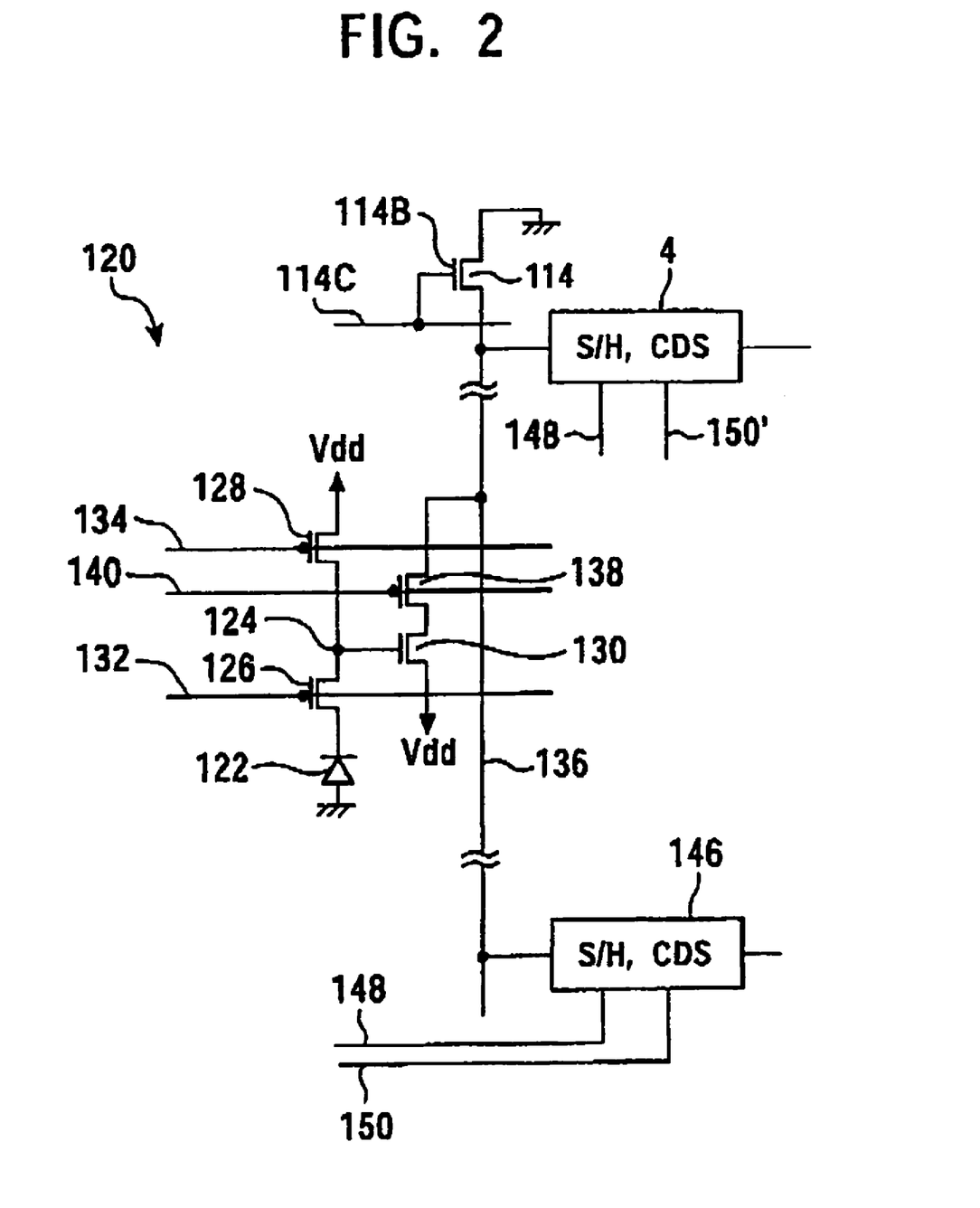
FIG. 2 is a circuit diagram showing a pixel and its peripheral part of the solid state imaging apparatus shown in FIG. 1.
Figure 3:
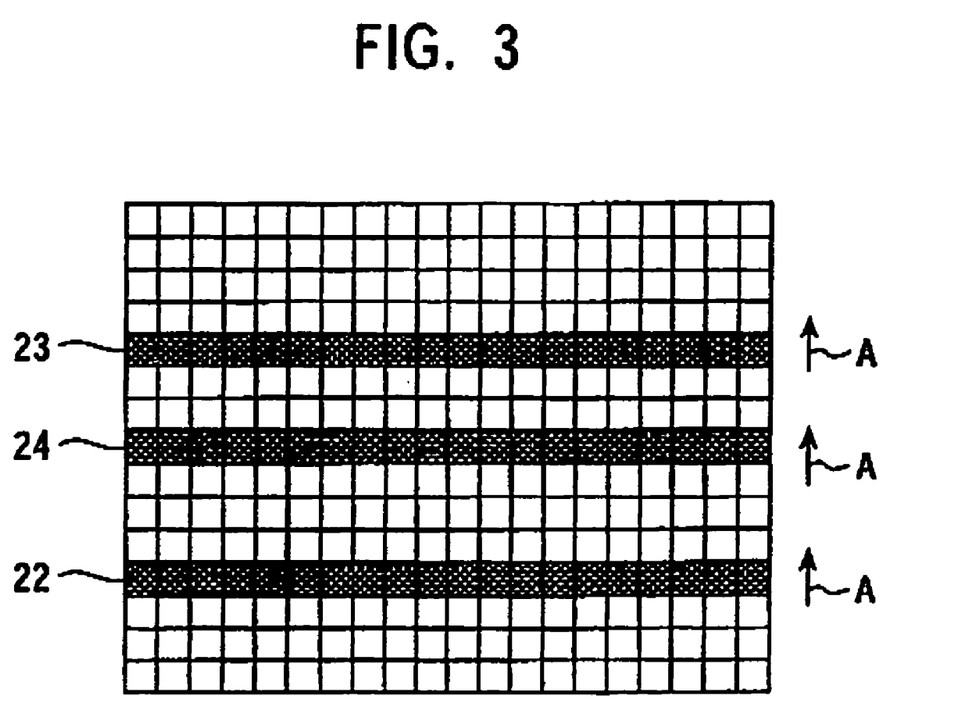
FIG. 3 is a diagram showing an FD electronic shutter line and a selection line used in the solid state imaging apparatus shown in FIG. 1.
Figure 4:
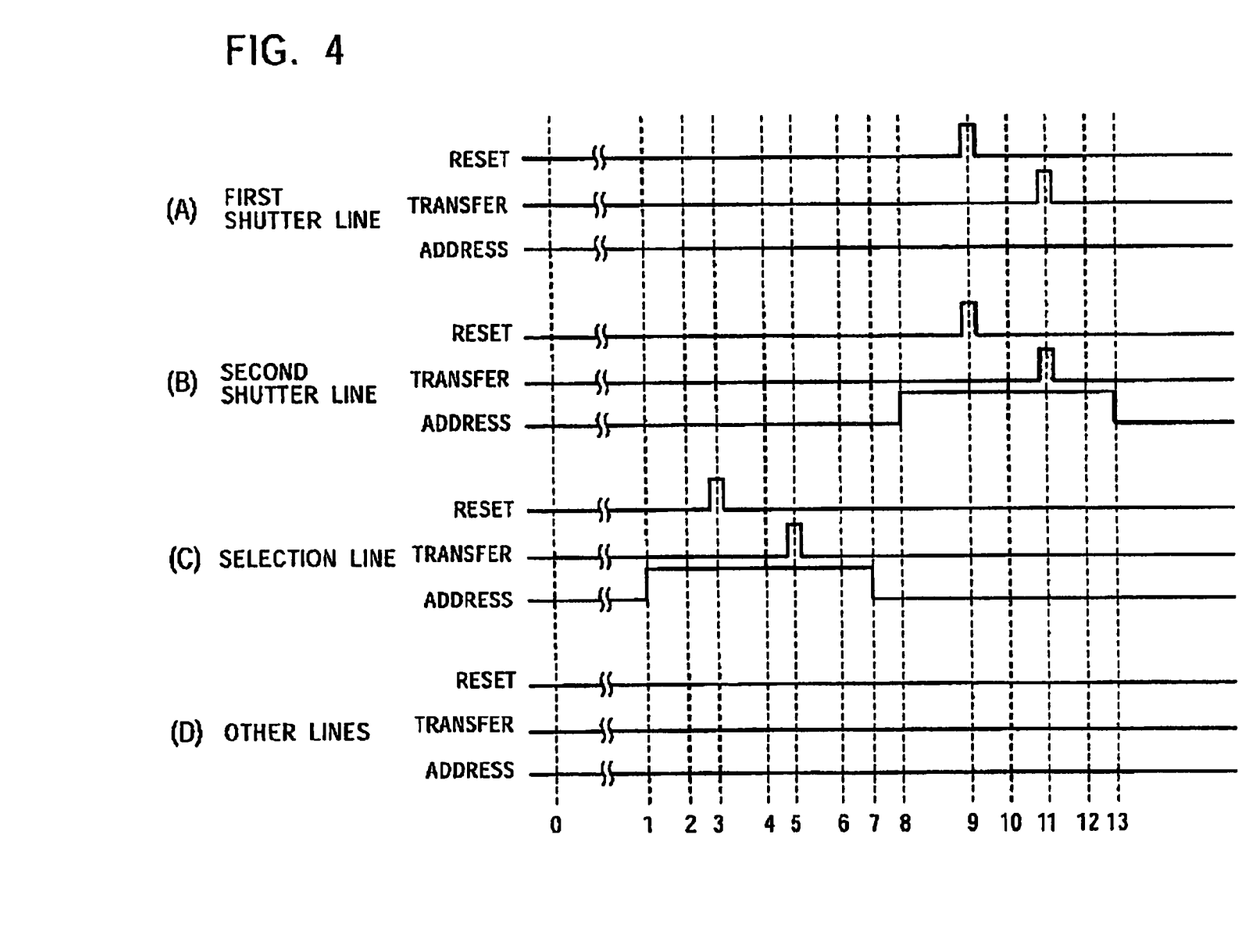
FIG. 4 is a timing chart of an operation associated with the pixel shown in FIG. 2.

FIG. 1 shows an example of a construction of a solid state imaging apparatus according to the present invention. FIG. 2 is a circuit diagram showing a pixel and its peripheral part of the solid state imaging apparatus shown in FIG. 1. FIG. 3 shows an FD electronic shutter line and a selection line used in the solid state imaging apparatus shown in FIG. 1. FIG. 4 is a timing chart showing an operation of the pixel shown in FIG. 2. In FIGS. 1 and 2, similar elements to those in FIG. 9 or 10 are denoted by similar reference numerals, and they are not described herein in further detail. Referring to those figures, an embodiment of a solid state imaging apparatus according to the present invention is described below, wherein a method of driving such a solid state imaging apparatus is also described.

In the present embodiment, as shown in FIGS. 1 and 2, the solid state imaging apparatus 2 includes additional circuit elements, that is, S/H-CDS circuits 4 (FIG. 2), which are disposed such that one S/H-CDS circuit 4 is connected to each pixel column of a pixel array 104 in which pixels 120 are arranged in a matrix fashion. In response to a sampling pulses 148 and 150' supplied from a timing generator 6 (FIG. 1), the S/H-CDS circuit 4 holds voltages on a vertical signal line 136 at different times and determines the difference between the two voltages held at the different times thereby obtaining a signal component including no offset component. The S/H-CDS circuits 4 are included in an S/H-CDS set 10 shown in FIG. 1.

In the present embodiment, as shown in FIG. 1, the solid state imaging apparatus 2 further includes an additional unit, horizontal selection means 12, in addition to the S/H-CDS set 10. Signals output from the S/H-CDS circuits 4 of the S/H-CDS set 10 are sequentially selected by the horizontal selection means 12 and output from an output unit 16 via a horizontal signal line 14.

In the present embodiment, the output unit 16 is made up of a variable gain amplifier and an analog-to-digital converter. Similarly, an output unit 118 for outputting a signal received via a horizontal signal line 116 is made up of a variable gain amplifier and an analog-to-digital converter.

As in the conventional technique, the timing generator 6 supplies timing pulses to the vertical selection means 7, the horizontal selection means 108, and the S/H-CDS set 112 and also to the S/H-CDS set 10 and the horizontal selection means 12 described above.

A constant current source 114 (FIG. 2) is formed by a MOS transistor 114B having a threshold voltage Vth equal to, for example, 0.45 V, wherein the gate of the MOS transistor 114B is connected to a 0.8-V power line 114C and the source is grounded so that a constant current of about 10 μA is passed through the vertical signal line 136 when the voltage on the vertical signal line 136 is equal to or higher than 0.4 V. A capacitor is disposed in series in an input path of each S/H-CDS circuit 4 or 146 so that no DC current flows into the S/H-CDS circuits 4 and 146.

The circuit configuration described above is similar to those disclosed in the previous patent applications (Japanese Patent Applications Nos. 2001-201601, 2001-276529, and 2001-296457) in particular in that when the vertical selection means 7 applies an address pulse 140 with a high level to an address gate 138 of each pixel 120, a source follower is formed by an amplification transistor 130 and the constant current source 114 disposed outside the pixel as shown in FIG. 2 so that the voltage on the vertical signal line 136 follows the gate voltage of the amplification transistor 130, that is, the voltage of the FD element 124.

However, the present embodiment is different from the previous patent applications in the driving timing.

The driving timing of the solid state imaging apparatus 2 according to the present embodiment is described below with reference to FIGS. 3 and 4.

In the solid state imaging apparatus 2 according to the present embodiment, the vertical selection means 7 selects a selection line, a first shutter line, and a second shutter line, and drives corresponding pixel lines. As shown in FIG. 3, the selection line 22, the first shutter line 23, and the second shutter line 24 are sequentially shifted line by line in a direction denoted by arrows A at fixed intervals. When all lines have been selected by the vertical selection means 7, one frame of image signal generated by all pixels 120 is output.

FIG. 4 shows timings of driving the first shutter line, the second shutter line, the selection line, and the other lines. Note that each pixel is driven in a period which is very short relative to the total period of one line, and the pixel is not driven at all during the remaining part of the one-line period as is the case at time T0.

First, as shown in FIG. 4(A), if the first shutter line comes to a certain pixel, the FD element 124 is rest at time T9 and a photo charge generated in a photodiode 122 is transferred to the FD element 124 at time T11. As a result, the photo charge accumulated in the photodiode 122 is removed and accumulation of a photo charge in the photodiode 122 is restarted.

Thereafter, as shown in FIG. 4(B), the second shutter line comes. The address of the pixel is turned on at time T8. This causes the voltage of the vertical signal line 136 to follow the voltage of the FD element 124 in the second shutter line. Thereafter, the FD element 124 is reset at time T9, and the voltage appearing, at time T10, on the signal line 136 is input to the S/H-CDS circuit 146.

The photo charge in the photodiode 122 is transferred to the FD element 124 at time T11, and the voltage appearing, at time T12, on the vertical signal line 136 is input to the S/H-CDS circuit 146. The S/H-CDS circuit 146 determines the difference between those two signals and holds the resultant differential signal. Herein, the differential signal corresponds to an optical signal applied to the photodiode 122 during the period from the first shutter line to the second shutter line.

Thereafter, the address gate is turned off at time T13.

Thereafter, as shown in FIG. 4(C), the selection line comes and the pixel is driven during a period from time T1 to time T7 in a similar manner as with the second shutter line. That is, the voltage on the signal line 136 is input to the S/H-CDS circuit 4 at time T4 and time T6, and the S/H-CDS circuit 4 determines the difference between those two signals and holds the resultant differential signal. Herein, the differential signal corresponds to an optical signal applied to the photodiode 122 during the period from the second shutter line to the selection line.

The signals held by the S/H-CDS circuit 146 and the S/H-CDS circuit 4 are sequentially read by the horizontal selection means 108 and the horizontal selection means 12, respectively, and supplied via the horizontal signal lines 116 and 14 to the output units 118 and 16, which in turn output the signals.

Thus, the output signal (output 1) from the output unit 118 corresponds to the optical signal obtained during the period from the first shutter line to the second shutter line, and the output signal (output 1) from the output unit 16 corresponds to the optical signal obtained during the period from the second shutter line to selection line. In this way, one frame is divided into three parts at arbitrary ratios, and signals obtained in two periods are independently output.

This can be used to increase the dynamic range as described below.

For example, if one frame including 500 lines is divided such that the interval from the first shutter line to the second shutter line includes 400 lines and the interval from the second shutter line to the selection line includes 5 lines, then the output signal (output 1) from the output unit 118 provides an image which is formed over a long storage period and in which a low-luminance area is clearly represented, while the output signal (output 2) from the output unit 16 provides an image which is formed in a short storage period and in which a high-luminance area with a dynamic range of as large as 80 is represented without encountering saturation.

Both output signals linearly depend on the amount of incident light, and the ratio between the two output signals can be definitely calculated from the locations of the shutter lines. The sensitivity associated with the two output signals can be independently varied by varying the locations of the two shutter lines. An image signal with a large dynamic range can be obtained by combining the two output signals.

Because the output signal (output 1) from the output unit 118 originates from the pixel signal associated with the second shutter line and the output signal (output 1) from the output unit 16 originates from the pixel signal associated with the selection line, it is required to delay one of the two signals using a delay element or a memory before the two signals are combined together.

The first shutter line may not be used. In this case, the output signal (signal 1) from the output unit 118 corresponds to an optical signal during a period from the previous selection line to the second shutter line.

In the specific example shown in FIG. 4, the first shutter line and the second shutter line are driven during the same period. This driving scheme allows a reduction in the driving time, and also makes it easy to design a circuit for generating driving pulses and controlling the respective lines.

Note that the first shutter line and the second shutter line may be driven in different periods. For example, if an increase in total driving time is allowed, it is desirable that the selection line, the first shutter line, and the second shutter line be driven by driving pulses which are the same in shape but shifted in time.

In the present invention, the driving pulses are not limited to those described above, but they can be modified in various manners.

In the present embodiment, as described above, one frame is divided into three parts, and signals with periods corresponding to two of the three parts are output. This allows expansion of freedom associated with the signal processing, and makes it possible to realize a solid state imaging apparatus with a large dynamic range. In addition, this technique provides further advantages described below.

(1) The both output signals of the respective two periods depend linearly on the amount of incident light, and the sensitivity ratio between the two output signals can be definitely calculated from the locations of the shutter lines.

(2) The sensitivity of the two output signals can be varied independently by varying the location of each shutter line.

(3) Embedded photodiodes with low noise can be used, and thus a high signal-to-noise ratio can be achieved. Because only optical signals accumulated in photodiodes are transferred and detected, high-accuracy signals can be output without encountering an influence of dark currents of FD elements. This makes it possible to achieve high reproducibility in representation of color.

(4) Because the two signals are output at the same time, the signal processing performed on the two output signals becomes easy.

(5) Pixels need no additional elements, and thus pixels can be realized without resulting in an increase in size.

Now, a second embodiment of the present invention is described below.

In the first embodiment of the present invention described above, pixel signals in the second shutter line are output (as the output 1) from the output unit 118, and pixel signals in the selection line are output (as the output 2) from the output unit 16, and thus the signals output from the output units 118 and 16 originate from different lines. This makes it necessary to delay one of the output signals using a delay element or a memory before the two output signals are mixed together to obtain a final signal with a large dynamic range.

In the second embodiment described below, to avoid the above problem, two signals are output from the same pixel at the same time thereby making it possible to directly mix the two signals without using a delay element or a memory.

The solid state imaging apparatus according to this second embodiment of the invention can be constructed in the same manner as shown in FIG. 1, and each pixel can be constructed in the same manner as shown in FIG. 2. Furthermore, the first shutter line, the second shutter line, and the selection line are shifted in the same manner as shown in FIG. 3, and the timings of driving the respective pixels are the same as shown in FIG. 4. However, the timings of inputting the signals to the S/H-CDS circuits 146 and 4 are different from those employed in the first embodiment. Thus, referring to FIGS. 1 to 4, the operation of the solid state imaging apparatus according to the second embodiment of the present invention is described below.

Figure 5:
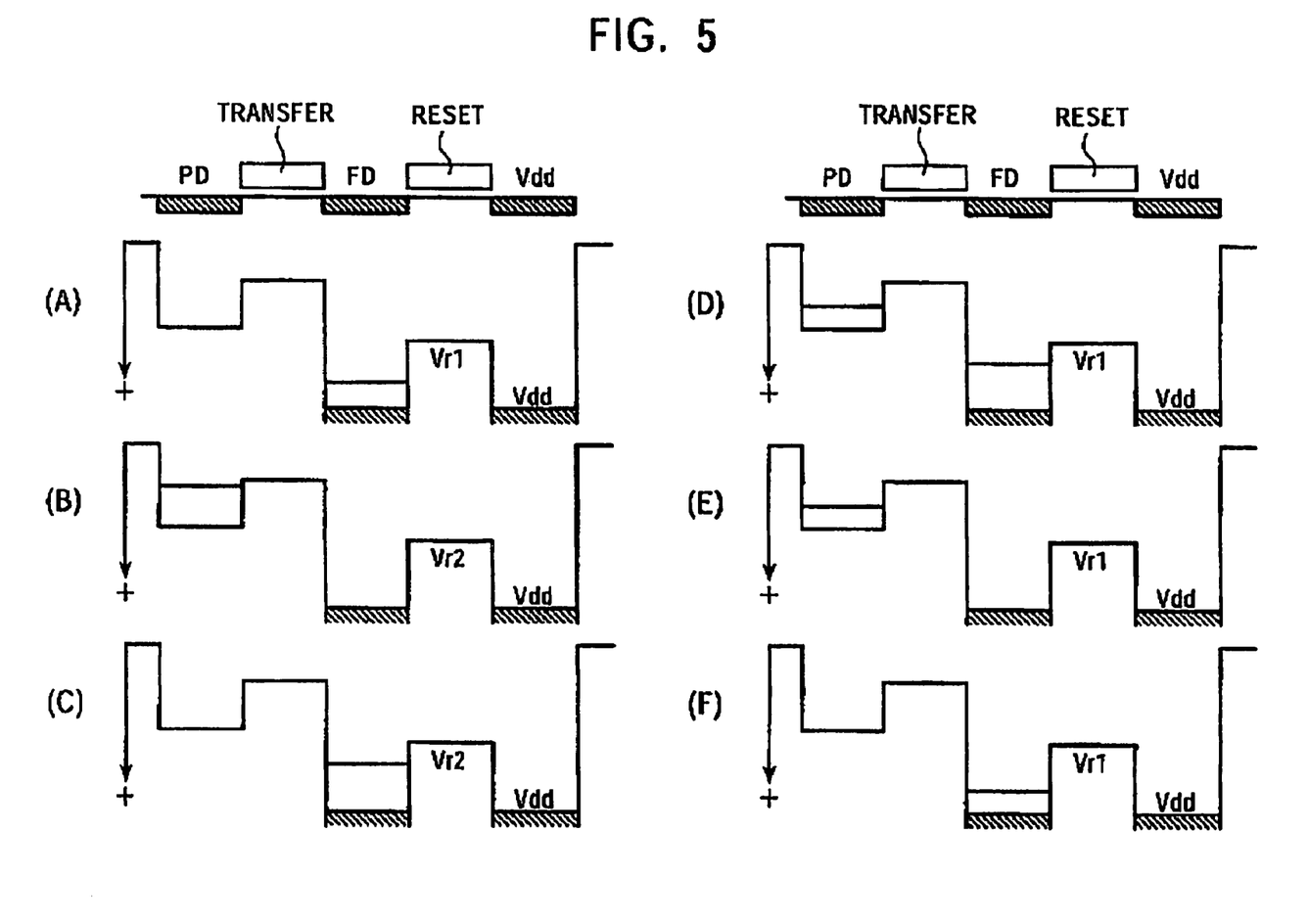
FIG. 5 is a diagram showing a change in potential of a photodiode and that of an FD element in the second embodiment of the present invention.

FIG. 5 shows a change in potential of a photodiode 122 and that of an FD element 124 according to the second embodiment of the present invention.

First, a photo charge is generated by light incident on the photodiode 122 and accumulated therein. Note that in FIG. 4, each pixel is driven in a period which is very short relative to the total scanning time of one line, and the pixel is not driven at all during the remaining period as with the case at time T0.

As shown in FIG. 4(A), when the first shutter line comes to a pixel, the FD element 124 of that pixel is reset at time T9, and a photo charge generated in a photodiode 122 is transferred to the FD element 124 at time T11. At time T12 immediate after that, the potential becomes as shown in FIG. 5(A), and accumulation of a photo charge in the photodiode 122 starts.

Thereafter, as shown in FIG. 4(B), the second shutter line comes. The photodiode 122 of that pixel includes the photo charge which has been accumulated during the period from the arrival of the first shutter line and the arrival of the second shutter line.

The address gate is turned on at time T8. This causes the voltage of the vertical signal line 136 to follow the voltage of the FD element 124 in the second shutter line after time T8. The FD element 124 is rest at time T9.

At time T10 after that, the potential becomes as shown in FIG. 5(B). At this time, the S/H-CDS circuit 146 performs no operation. This is different from the first embodiment (that is, in this second embodiment, unlike the first embodiment in which the voltage on the vertical signal 136 is sampled by the S/H-CDS circuit 146 at time T10, no voltage is sampled by the S/H-CDS circuit 146 at time T10).

Thereafter, at time T11, the photo charge, accumulated in the photodiode 122 during the period after the first shutter line came, is transferred to the FD element 124.

At time T12 after T11, the potential becomes as shown in FIG. 5(C). At this time, the S/H-CDS circuit 146 performs no operation. Also in this regard, the present embodiment is different from the first embodiment (that is, in this second embodiment, unlike the first embodiment in which the voltage on the vertical signal 136 is sampled by the S/H-CDS circuit 146 at time T12, no voltage is sampled by the S/H-CDS circuit 146 at time T12).

Thereafter, the address gate is turned off at a time T13.

Thereafter, as shown in FIG. 4(C), the selection line comes. The photodiode 122 of this pixel includes the photo charge which has been accumulated starting from the arrival of the second shutter line.

The address gate is turned on at time T1, and, thereafter, the voltage of the vertical signal line 136 follows the voltage of the FD element 124. At time T2, the potential becomes as shown in FIG. 5(D) because of the photo charge accumulated in the photodiode 122 during the period until this point of time. At this point of time, the voltage (first level) of the vertical signal line 136 is input to the S/H-CDS circuit 146. This first level corresponds to the level of the FD element 124 shown in FIG. 5(D), that is, the first level indicates the signal corresponding to the photo charge accumulated in the photodiode 122 during the period from the arrival of the first shutter line to that of the second shutter line.

Thereafter, the FD element 124 is rest at time T3.

At time T4 after that, the potential becomes as shown in FIG. 5(E). At this point of time, the voltage (reset level) of the vertical signal line 136 is input to the S/H-CDS circuit 146 and the S/H-CDS circuit 4.

At time T5, the photo charge is transferred from the photodiode 122 to the FD element 124.

At time T6, the potential becomes as shown in FIG. 5(F). At this point of time, the voltage (second level) of the vertical signal line 136 is input to the S/H-CDS circuit 4. This second level corresponds to the level of the FD element 124 shown in FIG. 5(E), that is, the second level indicates the signal corresponding to the photo charge accumulated in the photodiode 122 during the period from the arrival of the second shutter line to that of the selection line.

The S/H-CDS circuit 146 determines the difference between the first level and the reset level and holds the resultant differential voltage. Similarly, the S/H-CDS circuit 4 determines the difference between the second level and the reset level and holds the resultant differential voltage.

Thus, the S/H-CDS circuit 146 holds the voltage corresponding to the photo signal accumulated during the period from the arrival of the first shutter line to that of the second shutter line, and the S/H-CDS circuit 4 holds the voltage corresponding to the photo signal accumulated during the period from the arrival of the second shutter line to that of the selection line.

These two differential signals are sequentially read by the horizontal selection means 108 and the horizontal selection means 12, respectively, and supplied via the horizontal signal lines 116 and 14 to the output units 118 and 16, which in turn output the differential signals.

In the present embodiment, as described above, the signal output from the photodiode 122 during one frame is divided into three parts, and signals of two of the three parts are output from the same line. In the present embodiment, unlike the first embodiment, both output signals originate from pixel signals in the selection line, and thus the signals can be combined together without needing a delay element or a memory.

In the second embodiment, although the expansion of the dynamic range can be achieved as in the first embodiment, there are some concerns to be taken into account, as described below.

Herein, it is assumed that the first shutter line and the second shutter line are spaced from each other by m lines, and the second shutter line and the selection line are spaced from each other by n lines. When one frame is composed of 500 lines, m and n can be arbitrarily determined within the range of m+n≦500.

If m and n are set such that m=400 and n=5, a signal generated as a result of accumulation in an accumulation period corresponding to 400 lines is output (as output 1) from the output unit 118, and a signal generated as a result of accumulation in an accumulation period corresponding to 5 lines is output (as output 2) from the output unit 16. Thus, the output 1 provides an image in which a dark part is clearly represented, and the output 2 provides an image which is lower in sensitivity by a factor of 80 than that of the output 1 but which has a large dynamic range which makes it possible to represent high brightness greater by a factor of up to 80 than can be represented by the output 1.

Both output signals depend linearly on the amount of incident light, and the ratio between the two output signals can be definitely calculated from the locations of the shutter lines. The sensitivity of the two output signals can be varied independently by varying m or n. A signal with a large dynamic range can be obtained by combining the two output signals.

In the second embodiment, unlike the first embodiment in which either one of m and n can be greater (smaller) than the other, it is desirable to select m and n such that m>n as with the case in the specific example described above. The reason is that the first level originating from the photo charge held in the FD element 124 during the period corresponding to n lines can become inaccurate when the intensity of incident light becomes so high that an overflow of the photo charge from the photodiode 122 can occur during the period corresponding to n lines, and thus it is desirable that n should be set to be small enough and m should be set to be large enough.

Setting n to be small and m to be large also provides the following advantages. Because of the structure associated with the contact, the FD element 124 has a large dark current relative to that of the photodiode 122. Because the first level originates from the photo charge held by the FD element 124 during the period corresponding to n lines, the large dark current of the FD element 124 is incorporated into the first level during this period. If n is set to be small enough in the range of 1 to 10, the dark current incorporated during the period corresponding to n lines can be reduced to a low enough level, which results substantially in no reduction in the signal-to-noise ratio. On the other hand, in the case of the second level, the signal is output from the FD element 124 immediately after the photo charge has been transferred from the photodiode 122 to the FD element 124, and thus the dark current of the FD element 124 can be neglected.

Also in the second embodiment, as in the first embodiment, both output signals depend linearly on the amount of incident light, and the ratio between the two output signals can be definitely determined from the locations of the shutter lines. The sensitivity associated with the two output signals can be independently varied by varying the locations of the two shutter lines. An image signal with a large dynamic range can be obtained by combining the two output signals.

The first shutter line may not be used. In this case, the output signal (signal 1) from the output unit 118 corresponds to an optical signal during a period from the previous selection line to the second shutter line. In the present embodiment, the driving pulses are not limited to those described above, but they can be modified in various manners.

A third embodiment of the present invention is described below.

Figure 6:
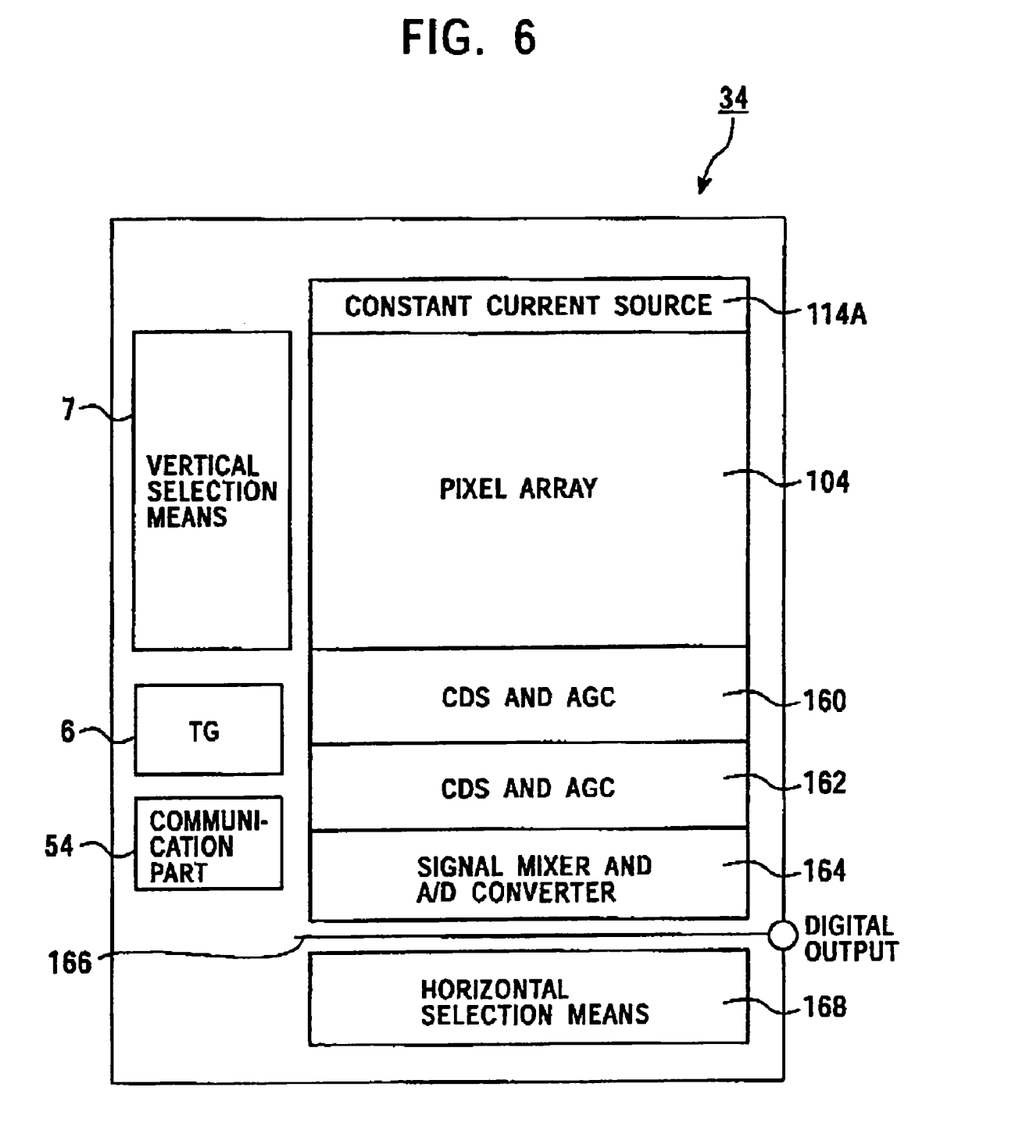
FIG. 6 is a general view of a solid state imaging apparatus according to a third embodiment of the present invention.

FIG. 6 shows a solid state imaging apparatus according to the third embodiment of the present invention.

As shown in FIG. 6, the solid state imaging apparatus 34 according to the present embodiment includes a communication unit 54 for receiving an external signal for controlling the driving mode of the solid state imaging apparatus 34.

In FIG. 6, the horizontal selection means 108 and the horizontal selection means 12 are combined together into a single horizontal selection means 168, and the S/H-CDS circuits 146 and 4 and the output units 118 and 16 are combined into CDS-AGC units 160 and 162. The output signals from the CDS-AGC circuits 160 and 162 are mixed together by a signal mixer-A/D converter 164, and the resultant mixed signal is output in the form of a digital signal over a bus line 166. Essentially, these circuit elements are similar to those of the solid state imaging apparatus 3 shown in FIG. 1, and they are not described in further detail herein.

As for the S/H-CDS circuits 146 and 4 used in the embodiments described above, those of known various types can be employed.

Figure 7:
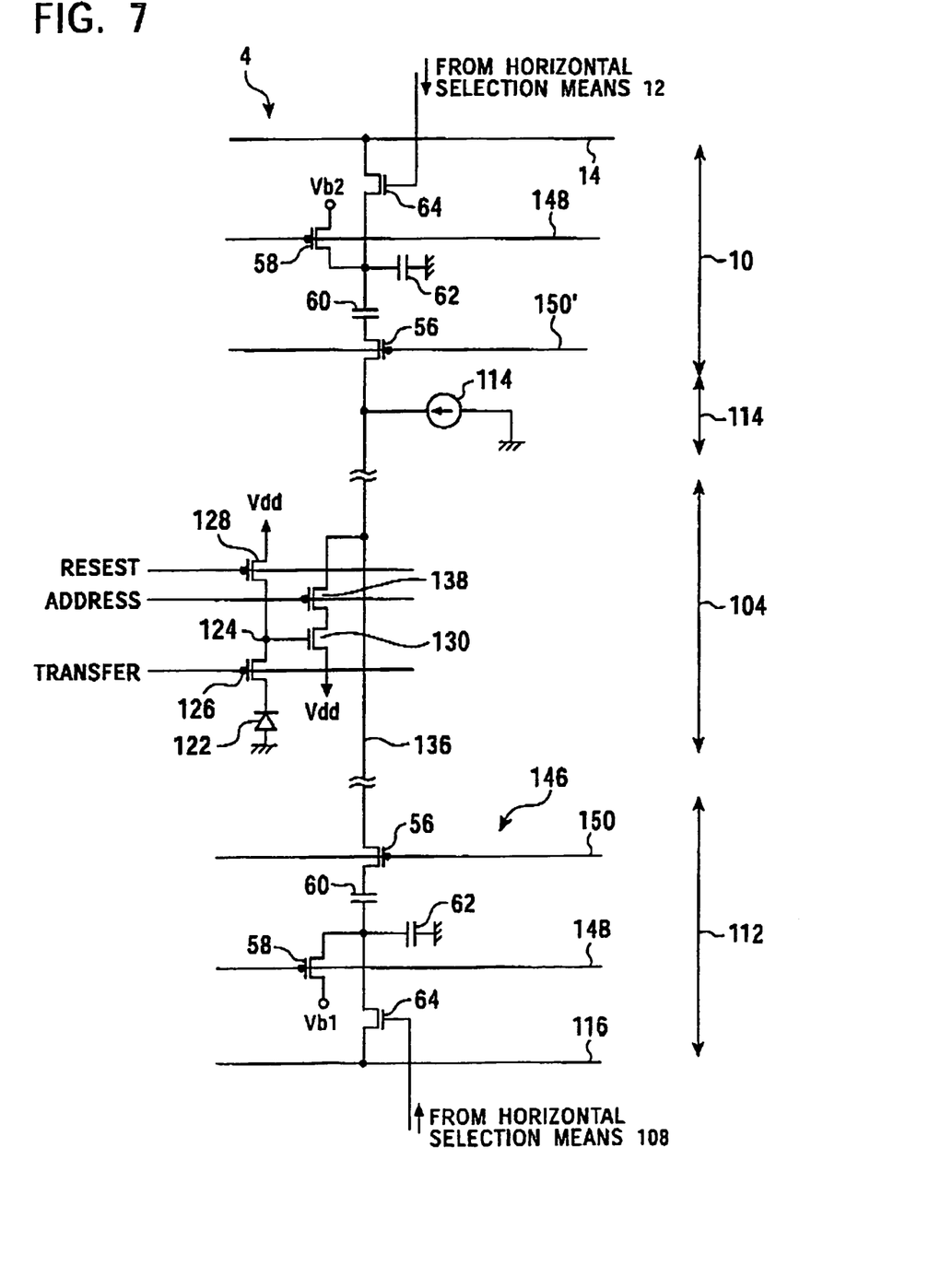
FIG. 7 is a circuit diagram showing an example of an S/H-CDS circuit.
Figure 8:
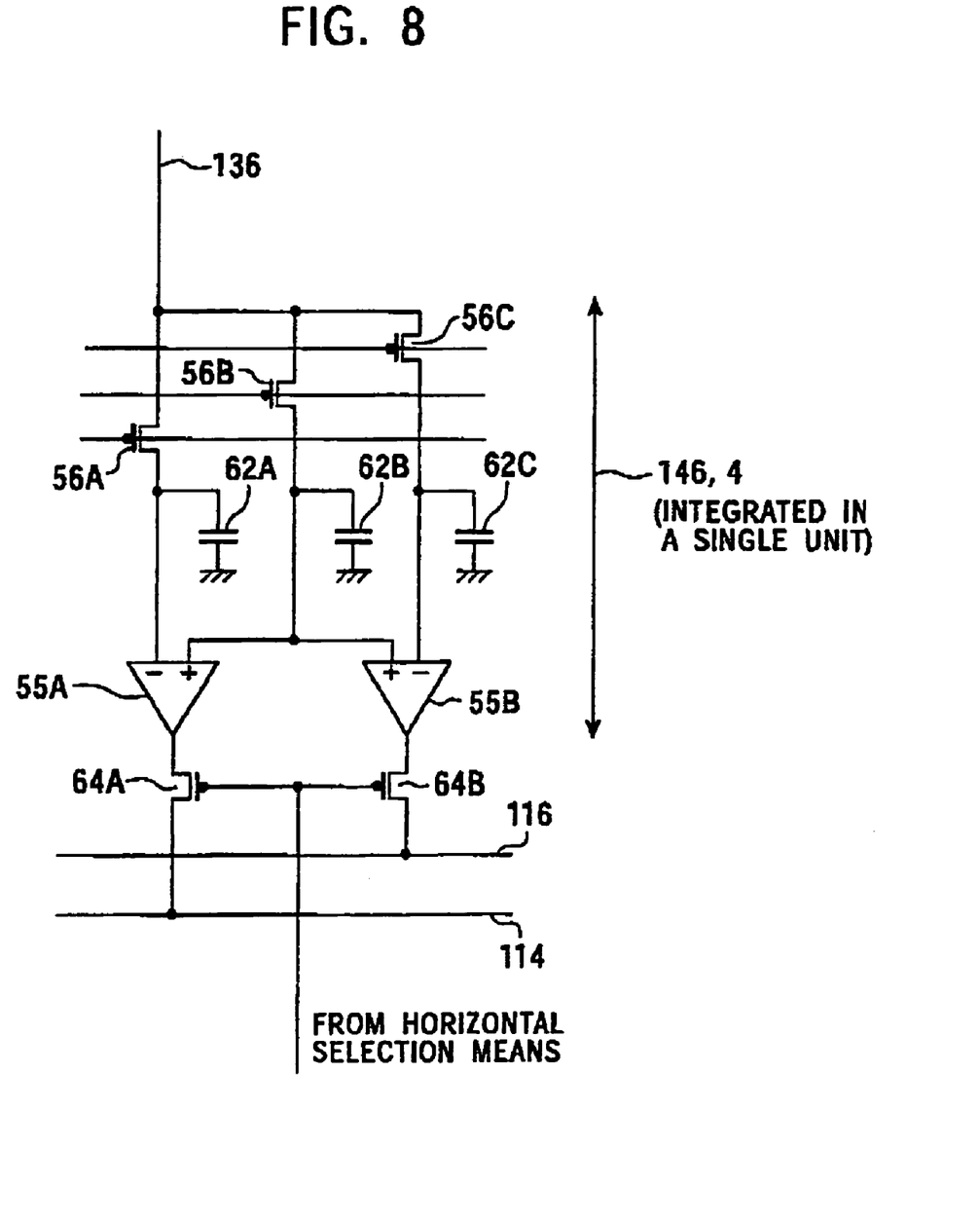
FIG. 8 is a circuit diagram showing another example of an S/H-CDS circuit.

FIGS. 7 and 8 show specific examples of S/H-CDS circuits 146 and 4.

In the example shown in FIG. 7, the S/H-CDS circuits 146 and 4 are formed separately and connected to a pixel 120. The S/H-CDS circuits 146 and 4 are identical in circuit configuration to each other. That is, each of the S/H-CDS circuits 146 and 4 includes transistors 56 and 58, capacitors 60 and 62, and a horizontal selection transistor 64. The drain of the transistor 56 is connected to the vertical signal line 136, and the source thereof is connected to one end of the capacitor 60. A second sampling pulse 150 or 150' generated by the timing generator 6 is applied to the gate of the transistor 56.

The drain of the transistor 58 is connected to the bias voltage source Vb, and the source thereof is connected to the other end of the capacitor 60. A first sampling pulse 148 generated by the timing generator 6 is applied to the gate of the transistor 58.

The capacitor 62 is connected between the other end of the capacitor 60 and ground, and the other end of the capacitor 60 is also connected to the drain of the horizontal selection transistor 64. The source of the horizontal selection transistor 64 is connected to the horizontal signal line 116 or 14. Selection pulses generated by the horizontal selection means 108 and 12 are applied separately to the gate of the horizontal transistors 64 of respective the S/H-CDS circuits 146 and 4.

FIG. 8 shows an example of a circuit configuration in which the two S/H-CDS circuits 146 and 4 are combined together into a single circuit (hereinafter, referred to as an S/H-CDS circuit 146/4).

The S/H-CDS circuit 146/4 is made up of differential amplifiers 55A and 55B, transistors 56A, 56B, and 56C, capacitors 62A, 62B, and 62C, and horizontal selection transistors 64A and 64B. The drain of each of transistors 56A, 56B, and 56C is connected to the vertical signal line 136.

The source of the transistor 56A is connected to the inverting input terminal of the differential amplifier 55A and one end of the capacitor 62A, and the source of the transistor 56C is connected to the inverting input terminal of the differential amplifier 55B and one end of the capacitor 62C. Second sampling pulses 150 and 150' generated by the timing generator 6 are supplied to the gates of the transistors 56A and 56C, respectively.

The source of the transistor 56B is connected to the non-inverting input terminals of the differential amplifiers 55A and 55B and also to one end of the capacitor 62B. A first sampling pulse 148 generated by the timing generator 6 is supplied to the gate of the transistor 56B.

The output terminals of the differential amplifiers 55A and 55B are connected to the drains of the horizontal selection transistors 64A and 64B, respectively, and the sources of the horizontal selection transistors 64A and 64B are connected to the horizontal signal lines 116 and 14, respectively. Selection pulses generated by the horizontal selection means 108 and 12 are separately supplied to the gates of the horizontal selection transistors 64A and 64B (not that the path of the selection pulses are denoted by one signal line in FIG. 8).

The S/H-CDS circuits are known in the art. The S/H-CDS circuits may be configured in different manners, although not described herein.

The present invention is applicable to a wide variety of solid state imaging apparatus using various types of S/H-CDS circuits.

The present invention has been described above with reference to specific embodiments. However, the invention is not limited to those embodiments described above, but various modifications are possible.

For example, although in the embodiments described above, electrons behave as carries, holes may be employed as carries. That is, p-type MOSFETS can be employed as MOSFETS serving as gates or other circuit elements to achieve similar functions and advantages without causing a difference in operation. Although in the embodiments described above, photodiodes are employed as photoelectric conversion elements, other types of photoelectric conversion elements such as a photo gate may be employed.

The embodiments according to the present invention described above are similar to those disclosed in the previous patent applications (Japanese Patent Applications Nos. 2001-201601, 2001-276529, and 2001-296457) in the construction of the solid state imaging apparatus and in that two signals are output, but different in that a charge overflowing from a photodiode is not used. That is, the present invention is essentially different from the previous patent application in that a photo charge entering an FD element during a photo charge accumulation period is not used, but only a photo charge accumulated in a photodiode is transferred to an FD unit and used.

The sensitivity ratio of one signal to the other signal can be definitely determined by setting m and n. By setting n to be small enough, the period of time in which a photo charge is held by an FD element can be minimized so that the dark current of the FD element does not have a significant influence on the signal-to-noise ratio. Thus, the present invention has features quite different from those of the previous patent applications.

What is claimed is:

1. A solid state imaging apparatus comprising:
   a matrix of pixels, each pixel including a photoelectric conversion element,
   transfer unit for transferring a signal charge generated by the photoelectric conversion element and accumulated therein to a floating diffusion element,
   reset unit for resetting the voltage of the floating diffusion element,
   amplification unit for providing an output corresponding to the voltage of the floating diffusion element, and outputting the output to an output signal line;
   vertical selection unit for sequentially selecting horizontal lines of pixels in the pixel matrix line by line in a vertical direction and wherein said vertical selection unit is capable of selecting at least two lines of pixels in the pixel matrix and sequentially shifting the selected line; and
   signal processing unit for processing signals output from the pixels selected by the vertical selection unit and
   wherein said signal processing unit is capable of independently reading the signals output from the respective pixels in the two lines selected by the vertical selection unit and
   wherein said signal processing unit captures pixel signals of two pixel lines selected by the vertical selection unit, immediately after a reset pulse is applied to the reset unit and immediately after a transfer pulse is applied to the transfer unit, and then determines the difference between the two pixel signals thereby obtaining an image signal.

2. A solid state imaging apparatus comprising:
   a matrix of pixels, each pixel including a photoelectric conversion element, transfer unit for transferring a signal charge generated by the photoelectric conversion element and accumulated therein to a floating diffusion element, reset unit for resetting the voltage of the floating diffusion element, amplification unit for providing an output corresponding to the voltage of the floating diffusion element, and outputting the output to an output signal line in response to a pixel selection operation;
   vertical selection unit for sequentially selecting horizontal lines of pixels in the pixel matrix line by line in a vertical direction and sequentially shifting the selected line, wherein a first horizontal line of pixels is selected as a first shutter line, a second horizontal line of pixels is selected as a second shutter line, and a third horizontal line of pixels is selected as a selection line; a signal processing unit for processing signals output from the pixels selected by the vertical selection unit and wherein said signal processing unit is capable of independently reading the signals output from the respective pixels in the lines selected by the vertical selection unit; and wherein the first shutter line causes the photoelectric conversion element to be reset.

3. A solid state imaging apparatus comprising:

a matrix of pixels, each pixel including a photoelectric conversion element, transfer unit for transferring a signal charge generated by the photoelectric conversion element and accumulated thereinto a floating diffusion element, reset unit for resetting the voltage of the floating diffusion element, amplification unit for providing an output corresponding to the voltage of the floating diffusion element, and outputting the output to an output signal line in response to a pixel selection operation;

vertical selection unit for sequentially selecting horizontal lines of pixels in the pixel matrix line by line in a vertical direction and sequentially shifting the selected line, wherein a first horizontal line of pixels is selected as a first shutter line, a second horizontal line of pixels is selected as a second shutter line and a third horizontal line of pixels is selected as a selection line, and wherein driving pulses for driving the first shutter line include a reset pulse and a transfer pulse and driving pulses for the second shutter line and the selection line include a reset pulse, a transfer pulse and an address pulse; and signal processing unit for processing signals output from the pixels selected by the vertical selection unit and wherein said signal processing unit is capable of independently reading the signals output from the respective pixels in the lines selected by the vertical selection unit.

4. A solid state imaging apparatus comprising:

a matrix of pixels, each pixel including a photoelectric conversion element, transfer unit for transferring a signal charge generated by the photoelectric conversion element and accumulated therein to a floating diffusion element, reset unit for resetting the voltage of the floating diffusion element, amplification unit for providing an output corresponding to the voltage of the floating diffusion element, and outputting the output to an output signal line in response to a pixel selection operation;

vertical selection unit for sequentially selecting horizontal lines of pixels in the pixel matrix line by line in a vertical direction and sequentially shifting the selected line, wherein a first horizontal line of pixels is selected as a first shutter line, a second horizontal line of pixels is selected as a second shutter line, and a third horizontal line of pixels is selected as a selection line;

a signal processing unit for processing signals output from the pixels selected by the vertical selection unit and wherein said signal processing unit is capable of independently reading the signals output from the respective pixels in the lines selected by the vertical selection unit; and wherein the driving pulses for driving the first shutter line, the second shutter line, and the selection line are all identical in shape to each other and shifted in time from each other.

5. A solid state imaging apparatus comprising:

a matrix of pixels, each pixel including a photoelectric conversion element, transfer unit for transferring a signal charge generated by the photoelectric conversion element and accumulated therein to a floating diffusion element, reset unit for resetting the voltage of the floating diffusion element, amplification unit for providing an output corresponding to the voltage of the floating diffusion element, and outputting the output to an output signal line in response to a pixel selection operation;

vertical selection unit for sequentially selecting horizontal lines of pixels in the pixel matrix line by line in a vertical direction and wherein said vertical selection unit is capable of selecting at a first horizontal line of pixels as a shutter line and a second horizontal line of pixels as a selection line; and signal processing unit for processing signals output from the pixels selected by the vertical selection unit and wherein said signal processing unit is capable of independently reading the signals output from the respective pixels in the two lines selected by the vertical selection unit and wherein said signal processing unit captures pixel signals of two pixel lines selected by the vertical selection unit; and wherein the signal processing unit performs signal processing on the two pixel lines selected by the vertical selection unit such that for the shutter line, the vertical selection unit resets the floating diffusion element and transfers the photo charge from the photoelectric conversion element to the floating diffusion element, while for the selection line, after the address pulse is activated, the signal processing unit captures pixel signals before the reset pulse and after the reset pulse and the transfer pulse, and then the signal processing unit determines the difference between the two captured pixel signals thereby obtaining an image signal.

6. A solid state imaging apparatus comprising:

a matrix of pixels, each pixel including a photoelectric conversion element, transfer unit for transferring a signal charge generated by the photoelectric conversion element and accumulated therein to a floating diffusion element, reset unit for resetting the voltage of the floating diffusion element, amplification unit for providing an output corresponding to the voltage of the floating diffusion element, and outputting the output to an output signal line in response to a pixel selection operation;

vertical selection unit for sequentially selecting horizontal lines of pixels in the pixel matrix line by line in a vertical direction and wherein said vertical selection unit is capable of selecting at least two lines of pixels in the pixel matrix and sequentially shifting the selected line;

signal processing unit for processing signals output from the pixels selected by the vertical selection unit and wherein said signal processing unit is capable of independently reading the signals output from the respective pixels in the two lines selected by the vertical selection unit and wherein said signal processing unit captures pixel signals of two pixel lines selected by the vertical selection unit, and wherein the first shutter line causes the photoelectric conversion element to be reset.

7. A solid state imaging apparatus comprising:
a matrix of pixels, each pixel including a photoelectric conversion element,
transfer unit for transferring a signal charge generated by the photoelectric conversion element and accumulated therein to a floating diffusion element,
reset unit for resetting the voltage of the floating diffusion element,
amplification unit for providing an output corresponding to the voltage of the floating diffusion element, and outputting the output to an output signal line in response to a pixel selection operation;
vertical selection unit for sequentially selecting horizontal lines of pixels in the pixel matrix line by line in a vertical direction and wherein said vertical selection unit is capable of selecting at least two lines of pixels in the pixel matrix and sequentially shifting the selected line;
signal processing unit for processing signals output from the pixels selected by the vertical selection unit and wherein said signal processing, unit is capable of independently reading the signals output from the respective pixels in the two lines selected by the vertical selection unit and wherein said signal processing unit captures pixel signals of two pixel lines selected by the vertical selection unit; and
wherein driving pulses for driving the first shutter line include a reset pulse and a transfer pulse which are the same as a reset pulse and a transfer pulse included in driving pulses for driving the selection line or the second shutter line, the driving pulses for driving the selection line or the second shutter line further including an address pulse.

8. A solid state imaging apparatus comprising:
a matrix of pixels, each pixel including a photoelectric conversion element,
transfer unit for transferring a signal charge generated by the photoelectric conversion element and accumulated therein to a floating diffusion element,
reset unit for resetting the voltage of the floating diffusion element,
amplification unit for providing an output corresponding to the voltage of the floating diffusion element, and
outputting the output to an output signal line in response to a pixel selection operation;
vertical selection unit for sequentially selecting horizontal lines of pixels in the pixel matrix line by line in a vertical direction and wherein said vertical selection unit is capable of selecting at least two lines of pixels in the pixel matrix and sequentially shifting the selected line;
signal processing unit for processing signals output from the pixels selected by the vertical selection unit and wherein said signal processing unit is capable of independently reading the signals output from the respective pixels in the two lines selected by the vertical selection unit and wherein said signal processing unit captures pixel signals of two pixel lines selected by the vertical selection; and
wherein the driving pulses for driving the first shutter line, the second shutter line, and the selection line are all identical in shape to each other and shifted in time from each other.

9. A solid state imaging apparatus comprising:
a matrix of pixels, each pixel including a photoelectric conversion element,
transfer unit for transferring a signal charge generated by the photoelectric conversion element and accumulated therein to a floating diffusion element,
reset unit for resetting the voltage of the floating diffusion element,
amplification unit for providing an output corresponding to the voltage of the floating diffusion element, and outputting the output to an output signal line in response to a pixel selection operation;
vertical selection unit for sequentially selecting horizontal lines of pixels in the pixel matrix line by line in a vertical direction and wherein said vertical selection unit is capable of selecting at least two lines of pixels in the pixel matrix and sequentially shifting the selected line;
signal processing unit for processing signals output from the pixels selected by the vertical selection unit and wherein said signal processing unit is capable of independently reading the signals output from the respective pixels in the two lines selected by the vertical selection unit and wherein said signal processing unit captures pixel signals of two pixel lines selected by the vertical selection unit; and
wherein the signal processing unit performs signal processing on the two pixel lines selected by the vertical selection unit such that for the shutter line, the vertical selection unit resets the floating diffusion element and transfers the photo charge from the photoelectric conversion element to the floating diffusion element, while for the selection line, after the address pulse is activated, the signal processing unit captures a pixel signal before the reset pulse, another pixel signal after the reset pulse, and still another pixel signal after the transfer pulse, and then the signal processing unit determines the difference between the pixel signal captured before the reset pulse and the pixel signal captured after the reset pulse and also determines the difference between the pixel signal captured after the reset pulse and the pixel signal captured after the transfer pulse, thereby obtaining an image signal.

10. A solid state imaging apparatus according to claim 9, wherein the vertical selection unit is capable of selecting a first horizontal line of pixels as a first shutter line, a second horizontal line of pixels as a second shutter line, and a third horizontal line of pixels as a selection line and wherein the first shutter line causes the photoelectric conversion element to be reset.

11. A solid state imaging apparatus according to claim 9, wherein the vertical selection unit is capable of selecting a first horizontal line of pixels as a first shutter line,
a second horizontal line of pixels as a second shutter line, and
a third horizontal line of pixels as a selection line and wherein driving pulses for driving the first shutter line include a reset pulse and a transfer pulse which are the same as a reset pulse and a transfer pulse and driving pulses for driving the selection line or the second shutter line include a reset pulse, a transfer pulse and an address pulse.

12. A solid state imaging apparatus according to claim 9, wherein the vertical selection unit is capable of selecting a first horizontal line of pixels as a first shutter line,
a second horizontal line of pixels as a second shutter line, and
a third horizontal line of pixels as a selection line wherein the driving pulses for driving the first shutter line, the second shutter line, and the selection line are all identical in shape to each other and shifted in time from each other.

* * * * *